Patented Mar. 27, 1934

1,952,988

UNITED STATES PATENT OFFICE 1,952,988

TREATMENT OF GOLD BEARING MATERIAL

Wesley Ernest John and Ernest Beyers, Johannesburg, Transvaal, Union of South Africa; said Beyers assignor to said John No Drawing. Application July 22, 1932, Serial No. 624,152. In the Union of South Africa August 31, 1931

2 Claims. (Cl. 75—185)

The present invention relates to the cyaniding of gold ores, and products of gold ores, for the recovery of the gold.

Gold ores often contain substances which hinder the recovery of gold by cyaniding, or increase the cost of such recovery. We have found that the harmful effects of the substances in question can be substantially reduced if the ore is subjected, before cyaniding, to magnetic separation.

According to this invention therefore, gold ores and their products are first subjected to magnetic separation and the non-magnetic constituent is treated with cyanide to recover its gold content.

When ores of the Witwatersrand type are subject to magnetic separation, pyrrhotite is removed with the magnetic constituent. Pyrrhotite is a precipitant for gold, and tends to reduce available cyanide by formation of thiocyanates and double cyanides of iron; and its removal from the ore facilitates the dissolution of the gold in the cyanide solution.

As the pyrrhotite is only feebly magnetic, it is not usually feasible to remove all of it by magnetic separation. Nevertheless, the removal of the proportion which can economically be extracted by this method has a marked beneficial effect on the non-magnetic residue.

The harmful effects of the pyrrhotite remaining in the non-magnetic constituent can be limited by using the minimum of lime in the solution and by carrying out the treatment without access of the atmosphere. A further beneficial effect is obtained by causing mercury to be present in the cyanide solution in amount not exceeding one part by weight in fifty-five thousand parts by weight of solution as described in application for Letters Patent filed June 2, 1932, Serial No. 615,066.

The magnetic constituent may be sufficient in quantity and rich enough to warrant its treatment for the recovery of its gold content; being in some cases of higher grade than the original ore. The concentration of the refractory constituent in the magnetic portion, however, renders such portion unadapted for treatment by the ordinary cyanide procedure; and a recovery process more in keeping with the material is necessary in order to obtain an effective extraction. Good results have been attained by treating the magnetic constituent by the above mentioned process in which the material is treated with cyanide solution containing mercury in solution in amount not exceeding one part by weight in fifty-five thousand parts by weight of solution. In this case also exclusion of the atmosphere is beneficial.

Black sand concentrate obtained hydraulically from alluvial deposits often contains fifty per cent and more of magnetic iron compounds which are generally barren. Upon these being removed magnetically not only is the bulk of material to be cyanided greatly reduced, but the residue is found to be more amenable to such further treatment than the original concentrate.

As another example, a gold antimony ore subjected to the magnetic process loses some of its antimony and iron; and although a relatively small weight of material is removed which contains little or no value, the residue is rendered less refractory, that is, more amenable to cyaniding.

We claim:

1. The process of treating gold bearing material containing pyrrhotite, which consists in subjecting the comminuted material to magnetic separation and thereby removing a magnetic constituent containing pyrrhotite, and subjecting the material remaining after the magnetic separation to treatment with cyanide solution containing mercury in solution in amount not exceeding one part by weight in fifty-five thousand parts by weight of solution and thereby extracting gold.

2. The process of treating gold bearing material containing pyrrhotite, which consists in subjecting the comminuted material to magnetic separation and thereby removing a magnetic constituent containing pyrrhotite, treating said magnetic constituent for recovery of its gold content, and subjecting the material remaining after the magnetic separation to treatment with cyanide solution containing mercury in solution in amount not exceeding one part by weight in fifty-five thousand parts by weight of solution and thereby extracting gold.

WESLEY ERNEST JOHN.
ERNEST BEYERS.